United States Patent [19]

Lundberg et al.

[11] Patent Number: 5,230,817
[45] Date of Patent: Jul. 27, 1993

[54] POLYANHYDRIDE MODIFIED ADDUCTS OR REACTANTS AND OLEAGINOUS COMPOSITIONS CONTAINING SAME

[75] Inventors: Robert D. Lundberg, Bridgewater, N.J.; Jacob Emert, Brooklyn, N.Y.; Antonio Gutierrez, Mercerville, N.J.

[73] Assignee: Exxon Chemical Patents Inc., Linden, N.J.

[21] Appl. No.: 680,030

[22] Filed: Mar. 28, 1991

Related U.S. Application Data

[63] Continuation of Ser. No. 161,919, Feb. 29, 1988, abandoned.

[51] Int. Cl.$^5$ ............... C10M 133/56; C10M 133/58; C10M 149/18
[52] U.S. Cl. ................... 252/51.5 A; 525/285; 525/426; 525/436; 528/322; 528/353; 548/520
[58] Field of Search ............... 252/151.5 A; 525/285, 525/426, 436; 528/322, 353; 548/520

[56] References Cited

U.S. PATENT DOCUMENTS

| | | |
|---|---|---|
| 3,078,271 | 2/1963 | De Groote et al. ............ 260/247.5 |
| 3,442,808 | 6/1969 | Traise et al. ............ 252/49.6 |
| 3,539,633 | 11/1970 | Piasek et al. ............ 260/570.5 |
| 3,630,904 | 12/1971 | Musser et al. ............ 252/51.5 |
| 4,137,185 | 1/1979 | Gardiner et al. ............ 252/51.5 A |
| 4,234,435 | 11/1980 | Meinhardt et al. ............ 252/47.5 |
| 4,354,950 | 10/1982 | Hammond et al. ............ 252/51.5 R |
| 4,428,849 | 12/1984 | Wisotsky ............ 252/33.4 |
| 4,517,104 | 6/1985 | Bloch et al. ............ 252/51.5 |
| 4,548,724 | 10/1985 | Karol et al. ............ 252/51.5 |
| 4,632,769 | 12/1986 | Gutierrez et al. ............ 252/51.5 A |
| 4,663,064 | 5/1987 | Nalesnik et al. ............ 252/51.5 |
| 4,713,189 | 12/1987 | Nalesnik et al. ............ 252/51.5 R |
| 4,747,964 | 5/1988 | Durand et al. ............ 252/51.5 |
| 4,803,003 | 2/1989 | Chung ............ 252/51.5 A |
| 5,035,821 | 7/1991 | Chung et al. ............ 252/51.5 A |
| 5,047,160 | 10/1991 | Emert et al. ............ 252/51.5 A |
| 5,062,980 | 11/1991 | Migdal et al. ............ 252/51.5 A |
| 5,085,788 | 2/1992 | Emert et al. ............ 252/51.5 A |

FOREIGN PATENT DOCUMENTS

| | | |
|---|---|---|
| 0213027 | 3/1987 | European Pat. Off. . |
| 0623706 | 4/1988 | European Pat. Off. . |
| 2062672 | 5/1981 | United Kingdom . |
| 87/01722 | 3/1987 | World Int. Prop. O. . |
| 87/07637 | 12/1987 | World Int. Prop. O. . |

*Primary Examiner*—Jerry Johnson
*Attorney, Agent, or Firm*—E. R. Skula; R. A. Maggio

[57] ABSTRACT

An oil soluble dispersant additive useful in oleaginous compositions selected from fuels and lubricating oils comprising the reaction products of:

(i) at least one intermediate adduct comprised of the reaction products of
  (a) at least one polyanhydride, and
  (b) at least one member selected from the group consisting of polyamines, polyols, and amino alcohols; and (ii) at least one member selected from the group consisting of
  (a) at least one long chain hydrocarbyl substituted $C_4-C_{10}$ dicarboxylic acid producing material, or
  (b) at least one long chain hydrocarbyl substituted hydroxy aromatic material and at least one aldehyde.

Also disclosed are oleaginous compositions, particularly lubricating oil compositions, containing these oil soluble dispersants.

41 Claims, No Drawings

POLYANHYDRIDE MODIFIED ADDUCTS OR REACTANTS AND OLEAGINOUS COMPOSITIONS CONTAINING SAME

This is a continuation of application Ser. No. 161,919, filed Feb. 29, 1988, now abandoned.

FIELD OF THE INVENTION

This invention relates to oil soluble dispersant additives useful in oleaginous compositions selected from fuel and lubricating oil compositions, including concentrates containing said additives, and methods for their manufacture and use. The dispersant additives are polyanhydride adducts which have been prepared by first reacting a polyanhydride with a polyamine, a polyol or an amino alcohol to form an intermediate adduct, whereafter the intermediate adduct is reacted with (1) a long chain hydrocarbon substituted hydroxy aromatic material such as phenol and an aldehyde such as formaldehyde or (2) a dicarboxylic acid, anhydride, ester, etc. which in turn has been substituted with a high molecular weight hydrocarbon group. The high molecular weight hydrocarbon group has a number average molecular weight ($\overline{M}_n$) of about 500 to about 6,000. The additives will have a ratio (functionality) of about 0.7 to 2.0 dicarboxylic acid producing moieties for each equivalent weight of the high molecular weight hydrocarbon therein.

BACKGROUND OF THE INVENTION

Multigrade lubricating oils typically are identified by two numbers such as 10W30, 5W30 etc. The first number in the multigrade designation is associated with a maximum low temperature (e.g. $-20°$ C.) viscosity requirement for that multigrade oil as measured typically by a cold cranking simulator (CCS) under high shear, while the second number in the multigrade designation is associated with a minimum high temperature (e.g. $100°$ C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about $-30°$ to about $-5°$ C. By "high temperature" as used herein is meant temperatures of typically at least about $100°$ C.

The minimum high temperature viscosity requirement, e.g. at $100°$ C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which efficiently meets both low and high temperature viscosity requirements, the formulator may use a single oil of desired viscosity or a blend of two lubricating oils of different viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g. S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not enable the formulator to meet the low and high temperature viscosity requirements of multigrade oils. The formulator's primary tool for achieving this goal is an additive conventionally referred to as a viscosity index improver (i.e., V.I. improver).

The V.I. improver is conventionally an oil-soluble long chain polymer. The large size of these polymers enables them to significantly increase Kinematic viscosities of base oils even at low concentrations. However, because solutions of high polymers are non-Newtonian they tend to give lower viscosities than expected in a high shear environment due to the alignment of the polymer. Consequently, V.I. improvers impact (i.e., increase) the low temperature (high shear) viscosities (i.e. CCS viscosity) of the base oil to a lesser extent than they do the high temperature (low shear) viscosities.

The aforesaid viscosity requirements for a multigrade oil can therefore be viewed as being increasingly antagonistic at increasingly higher levels of V.I. improver. For example, if a large quantity of V.I. improver is used in order to obtain high viscosity at high temperatures, the oil may now exceed the low temperature requirement. In another example, the formulator may be able to readily meet the requirement for a 10W30 oil but not a 5W30 oil, with a particular ad-pack (additive package) and base oil. Under these circumstances the formulator may attempt to lower the viscosity of the base oil, such as by increasing the proportion of low viscosity oil in a blend, to compensate for the low temperature viscosity increase induced by the V.I. improver, in order to meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulator's task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A high quality 10W30 commercial oil might contain from two to four times as much dispersant as V.I. improver (as measured by the respective dispersant and V.I. improver active ingredients). In addition to dispersancy, conventional dispersants can also increase the low and high temperature viscosity characteristics of a base oil simply by virtue of their polymeric nature. In contrast to the V.I. improver, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the V.I. improver. Thus, the magnitude of the low temperature viscosity increase induced by the dispersant can exceed the low temperature viscosity increase induced by the V.I. improver without the benefit of a proportionately greater increase in high temperature viscosity as obtained from a V.I. improver. Consequently, as the dispersant induced low temperature viscosity increase causes the low temperature viscosity of the oil to approach the maximum low temperature viscosity limit, the more difficult it is to introduce a sufficient amount of V.I. improver effective to meet the high temperature viscosity requirement and still meet the low temperature viscosity requirement. The formulator is thereby once again forced to shift to the undesirable expedient of using higher proportions of low viscosity oil to permit addition of the requisite amount of V.I. improver without exceeding the low temperature viscosity limit.

In accordance with the present invention, dispersants are provided which possess inherent characteristics such that they contribute considerably less to low temperature viscosity increases than dispersants of the prior art while achieving similar or greater high temperature viscosity increases. Moreover, as the concentration of dispersant in the base oil is increased, this beneficial low temperature viscosity effect becomes increasingly more pronounced relative to conventional dispersants. This advantage is especially significant for high quality heavy duty diesel oils which typically require high concentrations of dispersant additive. Furthermore, these improved viscosity properties facilitate the use of V.I. improvers in forming multigrade oils spanning a wider viscosity requirement range, such as 5W30 oils, due to the overall effect of lower viscosity increase at low temperatures while maintaining the desired viscosity at high temperatures as compared to the other dispersants. More significantly, these viscometric properties also permit the use of higher viscosity base stocks with attendant advantages in engine performance. Furthermore, the utilization of the dispersant additives of the instant invention allows a reduction in the amount of V.I. improvers required.

The materials of this invention are thus an improvement over conventional dispersants because of their effectiveness as dispersants coupled with enhanced low temperature viscometric properties. These materials are particularly useful with V.I. improvers in formulating multigrade oils.

SUMMARY OF THE INVENTION

The present invention is directed to oil soluble dispersant additives useful in oleaginous compositions selected from fuels and lubricating oils comprising the reaction products of:
(i) at least one intermediate adduct comprised of the reaction products of (a) at least one polyanhydride, and
(b) at least one member selected from the group consisting of polyamines, polyols, and amino alcohols; and (ii) at least one member selected from the group consisting of (a) long chain hydrocarbon substituted $C_4$–$C_{10}$ dicarboxylic acid producing material, or
(b) long chain hydrocarbon substituted hydroxy aromatic material and an aldehyde.

The intermediate adduct (i) is first preformed and this preformed intermediate adduct is subsequently reacted with (ii).

DETAILED DESCRIPTION OF THE INVENTION

In accordance with the present invention there are provided oil soluble dispersant compositions. These dispersants exhibit a high temperature to low temperature viscosity balance or ratio which is more favorable than that of conventional dispersant materials. That is to say the instant dispersant materials possess inherent characteristics such that they contribute less to low temperature viscosity increase than conventional prior art dispersants while increasing the contribution to the high temperature viscosity increase.

The dispersant materials of the instant invention comprise the reaction products of
(i) at least one intermediate adduct comprised of the reaction products of (a) at least one polyanhydride, and
(b) at least one member selected from the group consisting of polyamines, polyols, and amino alcohols; and (ii) at least one member selected from the group consisting of (a) long chain hydrocarbon substituted $C_4$–$C_{10}$ dicarboxylic acid producing material, or
(b) long chain hydrocarbon substituted hydroxy aromatic material and an aldehyde.

The reaction product (i), also referred to in the specification and appended claims as the intermediate adduct, is then reacted with either (ii)(a) or (ii)(b) to form the adduct or dispersant of the present invention. If (i)(b) is a polyamine then it contains at least two reactive amino groups, one of said amino groups being a primary amino group and the other reactive amino group being a primary amino group or a secondary amino group.

In a preferred embodiment of the instant invention (i)(b) is a polyamine, and in the following discussion concerning the reaction between (i)(a) and (i)(b) to form the intermediate adduct, (i)(b) will be assumed to be such a polyamine.

For purposes of illustration and exemplification only the reaction between one mole of a polyanhydride, e.g., a dianhydride, and two moles of a polyamine such as tetraethylene pentamine (TEPA) to form the intermediate adduct is believed to be represented by the following reaction scheme:

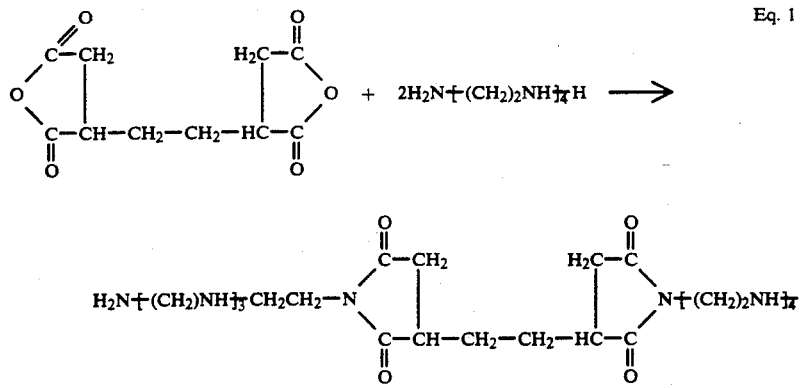

Eq. 1

This intermediate adduct is then reacted with either (ii)(a) or (ii)(b) to form the dispersant of this invention.

For purpose of illustration and exemplification only if this intermediate adduct is reacted with (ii)(a), such as polyisobutenyl succinic anhydride, i.e., 2 moles of

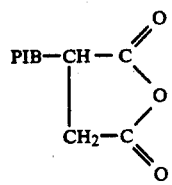

where PIB represents polyisobutylene having a number average molecular weight of from about 500 to about 6,000, the product is a mixture of amides, imides and esters, e.g.,

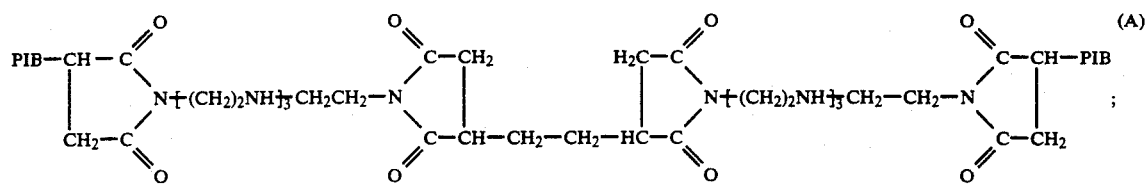
(A)

and/or

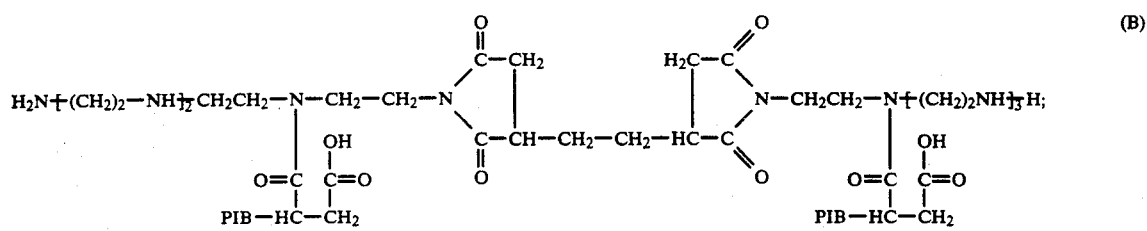
(B)

and/or

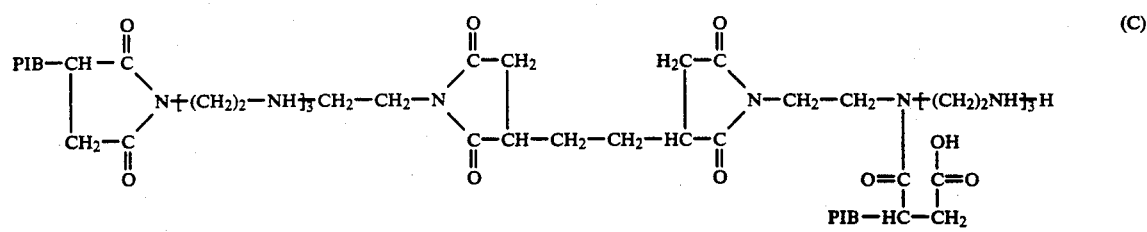
(C)

Product A is an imide formed by the reaction of both moles of polyisobutenyl succinic anhydride (ii)(a) with the primary amino groups of the intermediate adduct. Product B is an imide-amide formed by the reaction of one mole of polyisobutenyl succinic anhydride (ii)(a) with a primary amino group of the intermediate adduct and the reaction of the second mole of (ii)(a) with a secondary amino group of the intermediate adduct. Product C is formed by the reaction of both moles of (ii)(a) with secondary amino groups of the intermediate adduct (i).

If the intermediate adduct is reacted with (ii)(b) the reaction may be represented as follows:

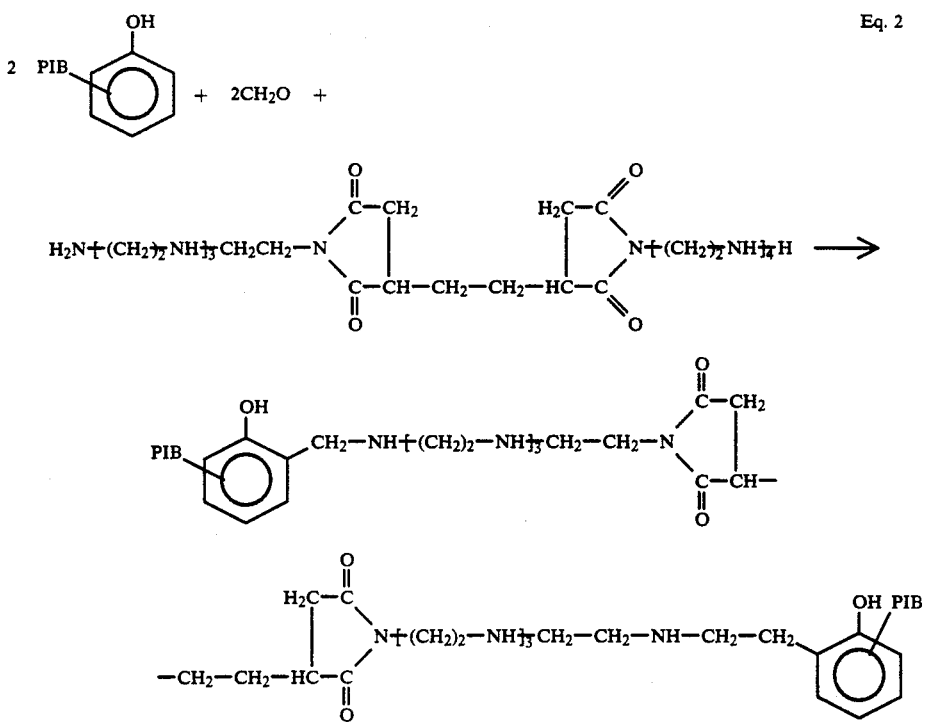

Eq. 2

ACID PRODUCING MATERIAL

The long chain hydrocarbon substituted $C_4$–$C_{10}$ dicarboxylic acid producing materials or acylating agents which may be reacted with the polyanhydride-polyamine, polyanhydride-polyol, and/or polyanhydride-amino alcohol intermediate adducts to form the dispersant additives of the instant invention are dicarboxylic acid materials, e.g., acid, anhydride or ester materials, which are substituted with a long chain hydrocarbyl group, generally a polyolefin, and which contain typically an average of at least about 0.7, usefully from about 0.7–2.0 (e.g., 0.9–1.6) preferably about 1.0–1.3 (e.g. 1.1–1.2) moles, per mole of hydrocarbyl, of a $C_4$ to $C_{10}$ dicarboxylic acid, anhydride or ester thereof, such as succinic acid, succinic anhydride, dimethyl methylsuccinate, etc., and mixtures thereof.

The hydrocarbyl substituted dicarboxylic acid materials, as well as methods for their preparation, are well known in the art and are amply described in the patent literature. They may be obtained, for example, by the Ene reaction between a polyolefin and an alpha-beta unsaturated $C_4$ to $C_{10}$ dicarboxylic acid, anhydride or ester thereof, such as fumaric acid, itaconic acid, maleic acid, maleic anhydride, chloromaleic acid, dimethyl fumarate, etc.

The hydrocarbyl substituted dicarboxylic acid materials function as acylating agents for the polyepoxide intermediate adduct.

Preferred olefin polymers for reaction with the unsaturated dicarboxylic acid, anhydride, or ester are polymers comprising a major molar amount of $C_2$ to $C_8$, e.g. $C_2$ to $C_5$, monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases the olefin polymer may be completely saturated, for example an ethylene-propylene copolymer made by a Ziegler-Natta synthesis using hydrogen as a moderator to control molecular weight.

The olefin polymers will usually have number average molecular weights ($\overline{M}_n$) within the range of about 500 and about 6000, e.g. 700 to 3000, preferably between about 800 and about 2500. An especially useful starting material for a highly potent dispersant additive made in accordance with this invention is polyisobutylene.

Processes for reacting the olefin polymer with the $C_4$–$C_{10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Alternatively, the olefin polymer can be first halogenated, for example, chlorinated or brominated to about 1 to 8 wt. %, preferably 3 to 7 wt. % chlorine or bromine, based on the weight of polymer, by passing the chlorine or bromine through the polyolefin at a temperature of 25° to 160° C., e.g., 120° C., for about 0.5 to 10, preferably 1 to 7 hours. The halogenated polymer may then be reacted with sufficient unsaturated acid or anhydride at 100° to 250° C., usually about 180° to 220° C., for about 0.5 to 10 hours, e.g. 3 to 8 hours, so the product obtained will contain an average of about 1.0 to 2.0 moles, preferably 1.1 to 1.4 moles, e.g., 1.2 moles, of the unsaturated acid per mole of the halogenated polymer. Processes of this general type are taught in U.S. Pat. Nos. 3,087,436; 3,172,892; 3,272,746 and others.

Alternatively, the olefin polymer and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g. polyisobutylene, will normally react with the dicarboxylic acid material. Upon carrying out a thermal reaction without the use of halogen or a catalyst, then usually only about 50 to 85 wt. % of the polyisobutylene will react. Chlorination helps increase the reactivity. For convenience, all of the aforesaid functionality ratios of dicarboxylic acid producing units to polyolefin, e.g. 1.0 to 2.0, etc. are based upon the total amount of polyolefin, that is, the total of both the reacted and unreacted polyolefin, present in the resulting product formed in the aforesaid reactions.

THE LONG CHAIN HYDROCARBON SUBSTITUTED HYDROXY AROMATIC MATERIAL

The hydrocarbyl substituted hydroxy aromatic compounds used in the invention include those compounds having the formula

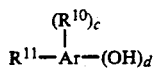

$$R^{11}-Ar-(OH)_d$$

wherein Ar represents

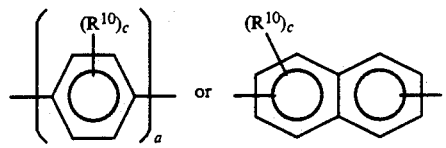

wherein a is 1 or 2, $R^{11}$ is a long chain hydrocarbon $R^{10}$ is a hydrocarbon or substituted hydrocarbon radical, having from 1 to about 3 carbon atoms or a halogen radical such as the bromide or chloride radical, f is an integer from 1 to 2, c is an integer from 0 to 2, and d is an integer from 1 to 2.

Illustrative of such Ar groups are phenylene, biphenylene, naphthylene and the like.

The preferred long chain hydrocarbon substituents are olefin polymers comprising a major molar amount of $C_2$ to $C_{10}$, e.g. $C_2$ to $C_5$ monoolefin. Such olefins include ethylene, propylene, butylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have a number average molecular weight ($\overline{M}_n$) within the range of about 500 and about 7,000, more usually between about 700 and about 3,000. Particularly useful olefin polymers have a number average molecular weight within the range of about 800 to about 2500, and more preferably within the range of about 850 to about 1,000 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for substituting the hydroxy aromatic compounds with the olefin polymer are known in the art and may be depicted as follows:

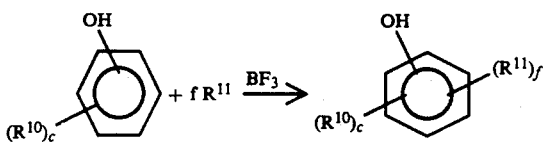

where $R^{10}$, $R^{11}$, f and c are as previously defined, and $BF_3$ is an alkylating catalyst. Processes of this type are described, for example, in U.S. Pat. Nos. 3,539,633 and 3,649,229, the disclosures of which are incorporated herein by reference.

Representative hydrocarbyl substituted hydroxy aromatic compounds contemplated for use in the present invention include, but are not limited to, 2-polypropylene phenol, 3-polypropylene phenol, 4-polypropylene phenol, 2-polybutylene phenol, 3-polyisobutylene phenol, 4-polyisobutylene phenol, 4-polyisobutylene-2-chlorophenol, 4-polyisobutylene-2-methylphenol, and the like.

Suitable hydrocarbyl-substituted polyhydroxy aromatic compounds include the polyolefin catechols, the polyolefin resorcinols, and the polyolefin hydroquinones, e.g., 4-polyisobutylene-1,2-dihydroxybenzene, 3-polypropylene-1,2-dihydroxy-benzene, 5-polyisobutylene-1,3-dihydroxybenzen, 4-polyamylene-1,3-dihydroxybenzene, and the like.

Suitable hydrocarbyl-substituted naphthols include 1-polyisobutylene-5-hydroxynaphthalene, 1-polypropylene-3-hydroxynaphthalene and the like.

The preferred long chain hydrocarbyl substituted hydroxy aromatic compounds to be used in this invention can be illustrated by the formula:

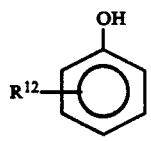   III wherein $R^{12}$ is hydrocarbyl of from 50 to 300 carbon atoms, and preferably is a polyolefin derived from a $C_2$ to $C_{10}$ (e.g., $C_2$ and $C_5$) mono-alpha-olefin.

THE ALDEHYDE MATERIAL

The aldehyde material which can be employed in this invention is represented by the formula:

in which $R^{13}$ is a hydrogen or an aliphatic hydrocarbon radical having from 1 to 4 carbon atoms. Examples of suitable aldehydes include formaldehyde, paraformaldehyde, acetaldehyde and the like.

POLYAMINES

Amine compounds useful as reactants with the polyanhydride to form the polyanhydride-polyamine intermediate adduct are those containing at least two reactive amino groups, i.e., primary and secondary amino groups. They include polyalkylene polyamines, of about 2 to 60 (e.g. 2 to 30), preferably 2 to 40, (e.g. 3 to 20) total carbon atoms and about 1 to 12 (e.g., 2 to 9), preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Such amines should be capable of reacting with the acid or anhydride groups of the hydrocarbyl substituted dicarboxylic acid moiety and with the anhydride groups of the polyanhydride moiety through the amino functionality or a substituent group reactive functionality. Since tertiary amines are generally unreactive with anhydrides it is desirable to have at least two primary and/or secondary amino groups on the amine. It is preferred that the amine contain at least one primary amino group, for reaction with the polyanhydride, and at least one secondary amino group, for reaction with the acylating agent. Preferred amines are aliphatic saturated amines, including those of the general formulae:

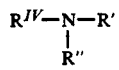

(I)

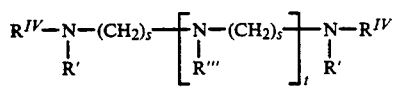

(Ia)

wherein $R^{IV}$, $R'$, $R''$ and $R'''$ are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein $R'''$ can additionally comprise a moiety of the formula

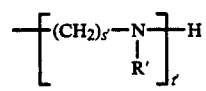

(Ib)

wherein $R'$ is as defined above, and wherein each s and s' can be the same or a different number of from 2 to 6, preferably 2 to 4; and t and t' can be the same or different and are each numbers of typically from 0 to 10, preferably about 2 to 7, most preferably about 3 to 7, with the proviso that t+t' is not greater than 10. To assure a facile reaction it is preferred that $R^{IV}$, $R'$, $R''$, $R'''$, (s), (s'), (t) and (t') be selected in a manner sufficient to provide the compounds of formula Ia with typically at least two primary and/or secondary amino groups. This can be achieved by selecting at least one of said $R^{IV}$, $R'$, $R''$, or $R'''$ groups to be hydrogen or by letting (t) in formula Ia be at least one when $R'''$ is H or when the (Ib) moiety possesses a secondary amino group. The most preferred amines of the above formulas are represented by formula Ia and contain at least two primary amino groups and at least one, and preferably at least three, secondary amino groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-1,3-diaminopropane; N,N-di-(2-aminoethyl) ethylene diamine: N-dodecyl-1,3-propane diamine; diisopropanol amine; mono-, di-, and tri-tallow amines; amino morpholines such as N-(3-aminopropyl) morpholine; and mixtures thereof.

Other useful amine compounds include: alicyclic diamines such as 1,4-di(aminoethyl) cyclohexane, and N-aminoalkyl piperazines of the general formula:

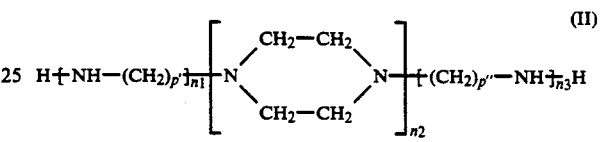

(II)

wherein $p_1$ and $p_2$ are the same or different and are each integers of from 1 to 4, and $n_1$, $n_2$ and $n_3$ are the same or different and are each integers of from 1 to 3.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and corresponding piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

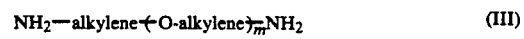

(III)

where m has a value of about 3 to 70 and preferably 10 to 35; and

(IV)

where n has a value of about 1 to 40, with the provision that the sum of all the n's is from about 3 to about 70, and preferably from about 6 to about 35, and $R^V$ is a substituted saturated hydrocarbon radical of up to 10 carbon atoms, wherein the number of substituents on the $R^V$ group is from 3 to 6, and "a" is a number from 3 to 6 which represents the number of substituents on $R^V$. The alkylene groups in either formula (III) or (IV) may be straight or branched chains containing about 2 to 7, and preferably about 2 to 4 carbon atoms.

The polyoxyalkylene polyamines of formulas (III) or (IV) above, preferably polyoxyalkylene diamines and polyoxyalkylene triamines, may have number average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The polyamine is readily reacted with the polyanhydride, with or without a catalyst, simply by heating a mixture of the polyanhydride and polyamine in a reaction vessel at a temperature of about 30° C. to about 200° C., more preferably to a temperature of about 75° C. to about 180° C., and most preferably at about 90° C. to about 160° C., for a sufficient period of time to effect reaction. A solvent for the polyanhydride, polyamine and/or intermediate adduct can be employed to control viscosity and/or reaction rates.

Catalysts useful in the promotion of the above-identified polyanhydride-polyamine reactions are selected from the group consisting of stannous octanoate, stannous hexanoate, stannous oxalate, tetrabutyl titanate, a variety of metal organic based catalyst acid catalysts and amine catalysts, as described on page 266, and forward in a book chapter authorized by R. D. Lundberg and E. F. Cox entitled, "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts of catalyst per one million parts by weight of the total reaction mixture.

POLYOL

In another aspect of the invention the polyanhydride intermediate adducts are prepared by reacting the polyanhydride with a polyol instead of with a polyamine.

Suitable polyol compounds which can be used include aliphatic polyhydric alcohols containing up to about 100 carbon atoms and about 2 to about 10 hydroxyl groups. These alcohols can be quite diverse in structure and chemical composition, for example, they can be substituted or unsubstituted, hindered or unhindered, branched chain or straight chain, etc. as desired. Typical alcohols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1,2propanediol, 1,2-butanediol, 1,4-butanediol, 2,3-hexanediol, pinacol, tetrahydroxy pentane, erythritol, arabitol, sorbitol, mannitol, 1,2-cyclohexanediol, 1,4-cyclohexanediol, 1,4-(2-hydroxyethyl)-cyclohexane, 1,4-dihydroxy-2-nitrobutane, 1,4-di-(2-hydroxyethyl)benzene, the carbohydrates such as glucose, mannose, glyceraldehyde, and galactose, and the like, copolymers of allyl alcohol and styrene, N,N'-di-(2-hydroxylethyl) glycine and esters thereof with lower mono-and polyhydric aliphatic alcohols, etc.

Included within the group of aliphatic alcohols are those alkane polyols which contain ether groups such as polyethylene oxide repeating units, as well as those polyhydric alcohols containing at least three hydroxyl groups, at least one of which has been esterified with a mono-carboxylic acid having from eight to about 30 carbon atoms such as octanoic acid, oleic acid, stearic acid, linoleic acid, dodecanoic acid, or tall oil acid. Examples of such partially esterified polyhydric alcohols are the mono-oleate of sorbitol, the mono-oleate of glycerol, the monostearate of glycerol, the di-stearate of sorbitol, and the di-dodecanoate of erythritol.

A preferred class of intermediates are those prepared from aliphatic alcohols containing up to 20 carbon atoms, and especially those containing three to 15 carbon atoms. This class of alcohols includes glycerol, erythritol, pentaerythritol, dipentaerythritol, tripentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)-cyclohexanol, 1,10-decanediol, digitalose, and the like. The adducts prepared from aliphatic alcohols containing at least three hydroxyl groups and up to fifteen carbon atoms are particularly preferred.

An especially preferred class of polyhydric alcohols for preparing the polyanhydride adducts used as intermediate materials or dispersant precursors in the present invention are the polyhydric alkanols containing three to 15, especially three to six carbon atoms and having at least three hydroxyl groups. Such alcohols are exemplified in the above specifically identified alcohols and are represented by glycerol, erythritol, pentaerythritol, mannitol, sorbitol, 1,2,4-hexanetriol, and tetrahydroxy pentane and the like.

The polyol is readily reacted with the polyanhydride by heating a mixture of the polyol and polyanhydride in a reaction vessel at a temperature of about 50° C. to about 200° C., more preferably to a temperature of about 75° C. to about 180° C., and most preferable at about 90° C. to about 160° C., for a sufficient period of time to effect reaction. Optionally, a solvent for the polyanhydride, polyol and/or the resulting adduct may be employed to control viscosity and/or the reaction rates.

Catalysts useful in the promotion of the polyanhydride-polyol reactions are the same as those which are useful in connection with the polyanhydride-polyamine reactions discussed above. The catalyst may be added to the reaction mixture at a concentration level of from about 50 to about 10,000 parts of catalyst per one million parts by weight of total reaction mixture.

AMINO ALCOHOL

In a manner analogous to that described for the polyanhydride-polyamine reaction and for the polyanhydride-polyol reaction, the polyanhydride can be reacted with an amino alcohol to form an intermediate adduct which can be further reacted with an acylating agent to form the dispersants of this invention.

Suitable amino alcohol compounds which can be reacted with the polyanhydride include those containing up to about 50 total carbon atoms and preferably up to about 10 total carbon atoms, from 1 to about 5 nitrogen atoms, preferably from 1 to 3 nitrogen atoms, and from 1 to about 15 hydroxyl groups, preferably from about 1 to 5 hydroxyl groups. Preferred amino alcohols include the 2,2-disubstituted-2-amino-1-alkanols having from two to three hydroxy groups and containing a total of 4 to 8 carbon atoms. These amino alcohols can be represented by the formula:

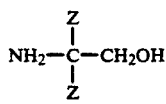

wherein Z is independently an alkyl or hydroxyalkyl group with the alkyl groups having from 1 to 3 carbon atoms wherein at least one, and preferably both, of the X substituents is a hydroxyalkyl group of the structure —$(CH_2)_n$OH, n being 1 to 3. Examples of such amino alcohols include: tri-(3-hydroxypropyl) amine; 2-amino-2-methyl-1,3-propanediol; 2-amino-2-ethyl1,3-propanediol; and 2-amino-2(hydroxymethyl)-1,3-propanediol; the latter also being known as THAM or tris(hydroxymethyl) amino methane. THAM is particularly preferred because of its effectiveness, availability and low cost.

The amino alcohol is readily reacted with the polyanhydride by heating a mixture of the polyanhydride and amino alcohol in a reaction vessel at a temperature of about 50° C. to about 200° C., more preferably at temperature of about 75° C. to about 180° C., and most preferably at about 90° C. to about 160° C., for a sufficient period of time to effect reaction. Optionally, a solvent for the polyanhydride, amino alcohol and/or the reaction product may be used to control viscosity and/or the reaction rates.

Catalysts useful in the promotion of the polyanhydride-amino alcohol reactions are the same as those which are useful in connection with the polyanhydride-polyamine and polyanhydride-polyol reactions, and corresponding amounts of catalysts may be employed.

POLYANHYDRIDES

The polyanhydrides which are reacted with the aforedescribed polyamines, polyols and/or amino alcohols to form the intermediate adducts or dispersant precursors of the instant invention are compounds containing at least two dicarboxylic acid anhydride moieties. These anhydride moieties are connected or joined by polyvalent hydrocarbon moieties or hydrocarbon moieties containing at least one hetero atom or group. The hydrocarbon moieties generally contain from 1 to about 1,000 carbon atoms, preferably from 2 to about 500 carbon atoms. These hydrocarbon moieties may be aliphatic, either saturated aliphatic or unsaturated aliphatic, cycloaliphatic, aromatic, or aliphatic aromatic. They may be monomeric or polymeric, e.g., polyisobutylene, in character. The aliphatic hydrocarbon moieties contain from 1 to about 1,000, preferably 2 to about 500, carbon atoms. The cycloaliphatic hydrocarbon moieties contain from 4 to about 16 ring carbon atoms. The ring carbon atoms may contain substituent groups, e.g., alkyl groups such as $C_1$-$C_{10}$ alkyl groups thereon. The aromatic hydrocarbon moieties contain from 6 to about 20 ring carbon atoms. The aliphatic-aromatic moieties contain from 7 to about 100, preferably 7 to about 50, carbon atoms. The hydrocarbon moieties joining the anhydride groups may contain substituent groups thereon. The substituent groups are those which are substantially inert or unreactive at ambient conditions with the anhydride groups. As used in the specification and appended claims the term "substantially inert and unreactive at ambient conditions" is intended to mean that the atom or group is substantially inert to chemical reactions at ambient temperature and pressure with the anhydride group so as not to materially interfere in an adverse manner with the preparation and/or functioning of the compositions, additives, compounds, etc. of this invention in the context of its intended use. For example, small amounts of these atoms or groups can undergo minimal reaction with the anhydride group without preventing the making and using of the invention as described herein. In other words, such reaction, while technically discernable, would not be sufficient to deter the practical worker of ordinary skill in the art from making and using the invention for its intended purposes. Suitable substituent groups include, but are not limited to, alkyl groups, hydroxyl groups, tertiary amino groups, halogens, and the like. When more than one substituent is present they may be the same or different.

It is to be understood that while many substituent groups are substantially inert or unreactive at ambient conditions with the anhydride group they will react with the anhydride group under conditions effective to allow reaction of the anhydride group with the reactive amino groups of the polyamine. Whether these groups are suitable substituent groups which can be present on the polyanhydride depends, in part, upon their reactivity with the anhydride group. Generally, if they are substantially more reactive with the anhydride group than the anhydride group is with the reactive amino group, they will tend to materially interfere in an adverse manner with the preparation of the dispersants of the present invention and may be present on the polyanhydride. An example of such a reactive but suitable group is the hydroxyl group. An example of an unsuitable substituent group is a primary amino group.

The hydrocarbon moieties containing at least one hetero atom or group are the hydrocarbon moieties described above which contain at least one hetero atom or group in the chain. The hetero atom or groups are those that are substantially unreactive at ambient conditions with the oxirane rings. When more then one hetero atom or group is present they may be the same or different. The hetero atoms or groups are preferably separated from the anhydride groups by at least one intervening carbon atom. These hetero atom or group containing hydrocarbon moieties may contain at least one substituent group on at least one carbon atom. These substituent groups are the same as those described above as being suitable for the hydrocarbon moieties.

Some illustrative non-limiting examples of suitable hetero atoms or groups include:

oxygen atoms (i.e., —O— or ether linkages in the carbon chain);

sulfur atoms (i.e. —S— or thioether linkages in the carbon chain);

carboxy groups (i.e. $-\overset{\overset{O}{\|}}{C}-O-$);

carbonyl group (i.e., $-\overset{\overset{O}{\|}}{C}-$);

sulfonyl group (i.e., $-\overset{O}{\underset{O}{\overset{\|}{S}}}-$);

sulfinyl group (i.e., $-\overset{O}{\overset{\|}{S}}-$); and nitro groups.

It is critical to the present invention that the polyanhydrides contain at least two dicarboxylic acid anhydride moieties on the same molecule. These polyanhydrides may be further characterized as polyanhydrides containing at least two dicarboxylic acid anhydride moieties joined or connected by a hydrocarbon moiety, a substituted hydrocarbon moiety, a hydrocarbon moiety containing at least one hetero atom or group, or a substituted hydrocarbon moiety containing at least one hetero atom or group. These polyanhydrides are well known in the art and are generally commercially available or may be readily prepared by conventional and well known methods.

The polyanhydrides of the instant invention may be represented by the formula

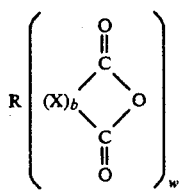

(V)

wherein:
b is 0 or 1;
w is the number of

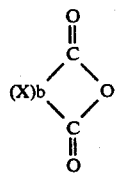

groups present on R, and is at least 2;
X is a q valent aliphatic acyclic hydrocarbon or substituted hydrocarbon radical containing from 2 to about 8 carbon atoms which together with the two carbonyl carbon atoms forms a cyclic structure, where q is 3 or 4; and
R is a z valent hydrocarbon radical, substituted hydrocarbon radical, hydrocarbon radical containing at least one hetero atom or group, or substituted hydrocarbon radical containing at least one hetero atom or group, where z=(q-2)w with the proviso that if b=0 then q=4.

In Formula V, X is independently selected from aliphatic, preferably saturated, acylic trivalent or tetravalent hydrocarbon radicals or substituted hydrocarbon radicals containing from 2 to about 8 carbon atoms which together with the two carbonyl carbon atoms forms a mono- or divalent cyclic structure. By trivalent or tetravalent hydrocarbon radicals is meant an aliphatic acyclic hydrocarbon, e.g., alkane, which has had removed from its carbon atoms three or four hydrogen atoms respectively. Some illustrative non-limiting examples of these tri- and tetravalent aliphatic acyclic hydrocarbon radicals include:

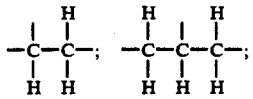

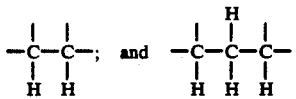

Since two of these valence bonds will be taken up by the two carbonyl carbon atoms there will be left one, in the case of x being trivalent, or two, in the case of x being tetravelent, valence bonds. Thus, if x is a trivalent radical the resulting cyclic structure formed between x and the two carbonyl carbon atoms will be monovalent while if x is a tetravalent radical the resulting cyclic structure will be divalent.

When X is a substituted aliphatic, preferably saturated, acyclic tri- or tetravalent hydrocarbon radical it contains from 1 to about 4 substituent groups on one or more carbon atoms. If more than one substituent group is present they may be the same or different. These substituent groups are those that do not materially interfere in an adverse manner with the preparation and/or functioning of the composition, additives, compounds, etc. of this invention in the context of its intended use. Some illustrative non-limiting examples of suitable substituent groups include alkyl radicals, preferably $C_1$ to $C_5$ alkyl radicals; halogens, preferably chlorine and bromine, and hydroxyl radicals. However, X is preferably unsubstituted.

When b is zero in Formula V the two carbonyl carbon atoms are bonded directly to the R moiety. An illustrative non-limiting example of such a case is cyclohexyl dianhydride; i.e.,

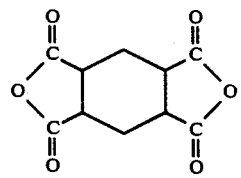

In this cyclohexyl dianhydride R is a tetravalent cycloaliphatic hydrocarbon radical, i.e., z=4, with q=4 since b is zero, and w=2.

In formula V w is an integer of at least 2. The upper limit of w is the number of replaceable hydrogen atoms present on R if p is one and x is a trivalent radical, or one half the number of replaceable hydrogen atoms present on R if p is one and x is a tetravalent radical or if p is zero. Generally, however, w has an upper value not greater than about 10, preferably about 6, and more preferably about 4.

R in Formula V is selected from z valent hydrocarbon radicals, substituted z valent hydrocarbon radicals, z valent hydrocarbon radicals containing at least one hetero atom or group, and z valent substituted hydrocarbon radicals containing at least one hetero atom or group. The hydrocarbon radicals generally contain from 1 to about 1,000 carbon atoms, preferably from 2 to about 50 carbon atoms and may be aliphatic, either saturated or unsaturated, cycloaliphatic, aromatic, or aliphatic-aromatic. They may be saturated or unsaturated, e.g., contain one or more ethylenic unsaturation sites. They may be polymeric or monomeric. An example of a polymeric R is polyisobutylene containing from about 40 to about 500 carbon atoms.

The aliphatic hydrocarbon radicals represented by R are generally those containing from 1 to about 1,000, preferably 2 to about 500, carbon atoms. They may be straight chain or branched. The cycloaliphatic radicals are preferably those containing from 4 to about 16 ring carbon atoms. They may contain substituent groups, e.g., lower alkyl groups, on one or more ring carbon atoms. These cycloaliphatic radicals include, for example, cycloalkylene, cycloalkylidine, cycloalkanetriyl, and cycloalkanetetrayl radicals. The aromatic radicals are typically those containing from 6 to 12 ring carbon atoms.

It is to be understood that the term "aromatic" as used in the specification and the appended claims is not intended to limit the polyvalent aromatic moiety represented by R to a benzene nucleus. Accordingly it is to be understood that the aromatic moiety can be a pyridine nucleus, a thiophene nucleus, a 1,2,3,4-tetrahydro naphthalene nucleus, etc., or a polynuclear aromatic moiety. Such polynuclear moieties can be of the fused type; that is, wherein at least one aromatic nucleus is fused at two points to another nucleus such as found in naphthalene, anthracene, the azanaphthalenes, etc. Alternatively, such polynuclear aromatic moieties can be of the linked type wherein at least two nuclei (either mono- or polynuclear) are linked through bridging linkages to each other. Such bridging linkages can be chosen from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

When the aromatic moiety, Ar, is, for example, a divalent linked polynuclear aromatic moiety it can be represented by the general formula $-Ar-(Lng-Ar)_w-$ wherein w is an integer of 1 to about 10, preferably 1 to about 8, more preferably 1, 2 or 3; Ar is a divalent aromatic moiety as described above, and each Lng is a bridging linkage individually chosen from the group consisting of carbon-to-carbon single bonds, ether linkages (e.g. —O—), keto linkages (e.g.,

sulfide linkages (e.g., —S—), polysulfide linkages of 2 to 6 sulfur atoms (e.g., —S2—6—), sulfinyl linkages (e.g., —S(O)—), sulfonyl linkages (e.g., —S(O)2—), lower alkylene linkages

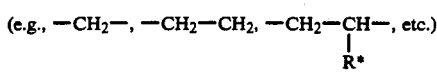

di(lower alkyl)-methylene linkages (e.g., —CR*2—), lower alkylene ether linkages (e.g.,

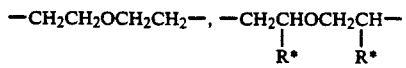

etc.) lower alkylene sulfide linkages (e.g., wherein one or more —O—'s in the lower alkylene ether linkages is replaced with an —S— atom), lower alkylene polysulfide linkages (e.g., wherein one or more —O—'s is replaced with a —S2—group), with R* being a lower alkyl group.

Illustrative of such divalent linked polynuclear aromatic moieties are those represented by the formula

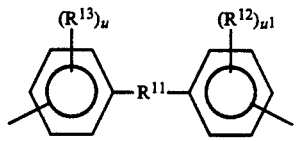

wherein $R^{12}$ and $R^{13}$ are independently selected from hydrogen and alkyl radicals, preferably alkyl radicals containing from 1 to about 20 carbon atoms; $R^{11}$ is selected from alkylene, alkylidene, cycloalkylene, and cycloalkylidene radicals; and u and $u_1$ are independently selected from integers having a value of from 1 to 4.

The aliphatic-aromatic radicals are those containing from 7 to about 50 carbon atoms.

Some illustrative non-limiting examples of polyanhydrides include

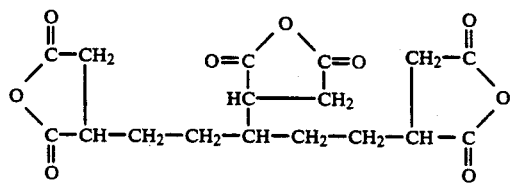

Included within the scope of the polyanhydrides of the instant invention are the dianhydrides. The dianhydrides include those represented by the formula

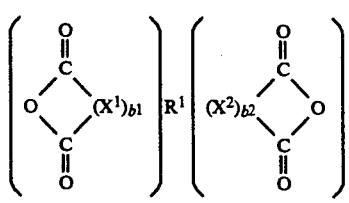

(VI)

wherein:
$b^2$ is 0 or 1;
$b^1$ is 0 or 1;
$X^2$ is a $q^2$ valent aliphatic acyclic hydrocarbon radical or substituted hydrocarbon radical containing from 2 to about 8 carbon atoms which together with the two carbonyl carbon atoms forms a cyclic structure, where $q^2$ is 3 or 4;

$X^1$ is a $q^1$ valent aliphatic acyclic hydrocarbon radical or substituted hydrocarbon radical containing from 2 to about 8 carbon atoms which together with the two carbonyl carbon atoms form a cyclic structure, where $q^1$ is 3 or 4;

$R^1$ is a $z^1$ valent hydrocarbon radical, substituted hydrocarbon radical, hydrocarbon radical containing at least one hetero atom or group, or substituted hydrocarbon radical containing at least one hetero atom or group, where $z^1 = (q^2 + q^1)-4$, with the proviso that if $b^1$ is zero than $q^2$ is 4 and if $b^1$ is zero than $q^1$ is 4.

$X^2$ and $X^1$ are preferably alkanetriyls or alkanetetrayls containing from 2 to about 8 carbon atoms.

$R^1$ generally contains from 1 to about 100, preferably 2 to about 50, carbon atoms and may be a divalent, trivalent, or tetravalent, i.e., $z^1$ is an integer having a value of from 2 to 4 inclusive, hydrocarbon radical, substituted hydrocarbon radical, hydrocarbon radical containing at least one hetero atom or group, or substituted hydrocarbon radical containing at least one hetero atom or group. The hydrocarbon radicals represented by $R^1$ may be aliphatic, either saturated or unsaturated, cycloalphatic, aromatic, or aliphatic-aromatic.

The dianhydrides of Formula VI wherein R is a divalent radical may be represented by the Formula

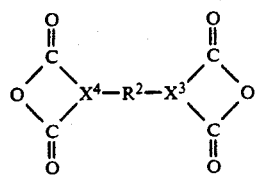

VIa wherein:

$R^2$ is a divalent hydrocarbon radical, a substituted divalent hydrocarbon radical, a divalent hydrocarbon radical containing at least one hetero atom or group, or a substituted divalent hydrocarbon radical containing at least one hetero atom or group.

$X^3$ is a trivalent aliphatic acyclic hydrocarbon or substituted hydrocarbon radical containing from 2 to about 8 carbon atoms which together with the two carbonyl carbon atoms forms a cyclic structure; and $X^4$ is a trivalent aliphatic acyclic hydrocarbon or substituted hydrocarbon radical containing from 2 to about 8 carbon atoms which together with the two carbonyl carbon atoms forms a cyclic structure.

The divalent hydrocarbon radicals represented by $R^2$ contain from 1 to about 100, preferably 2 to about 50, carbon atoms and include the alkylene, alkenylene, cycloalkylene, cycloalkylidene, arylene, alkarylene and arylalkenylene radicals. The alkylene radicals contain from 1 to about 100 carbon, and preferably 2 to about 50, may be straight chain or branched. Typical cycloalkylene and cycloalkylidene radicals are there containing from 4 to about 16 ring carbon atoms. The cycloalkylene and cyclo-alkylidene radicals may contain substituent groups, e.g., lower alkyl groups, on one or more ring carbon atoms. When more than one substituent group is present they may be the same or different. Typical arylene radicals are those containing from 6 to 12 ring carbons, e.g., phenylene, naphthylene and biphenylene. Typical alkarylene and aralkylene radicals are those containing from 7 to about 50 carbon atoms.

The substituted divalent hydrocarbon radicals represented by $R^2$ are those divalent hydrocarbon radicals defined above which contain at least one substituent group, typically from 1 to about 5 substituent groups, of the type described hereinafore.

The divalent hydrocarbon radicals containing at least one hetero atom or group represented by $R^1$ are those divalent hydrocarbon radicals defined above which contain at least one hetero atom or group of the type defined hereinafore in the carbon chain.

Some illustrative non-limiting examples of dianhydrides of Formula VIa include

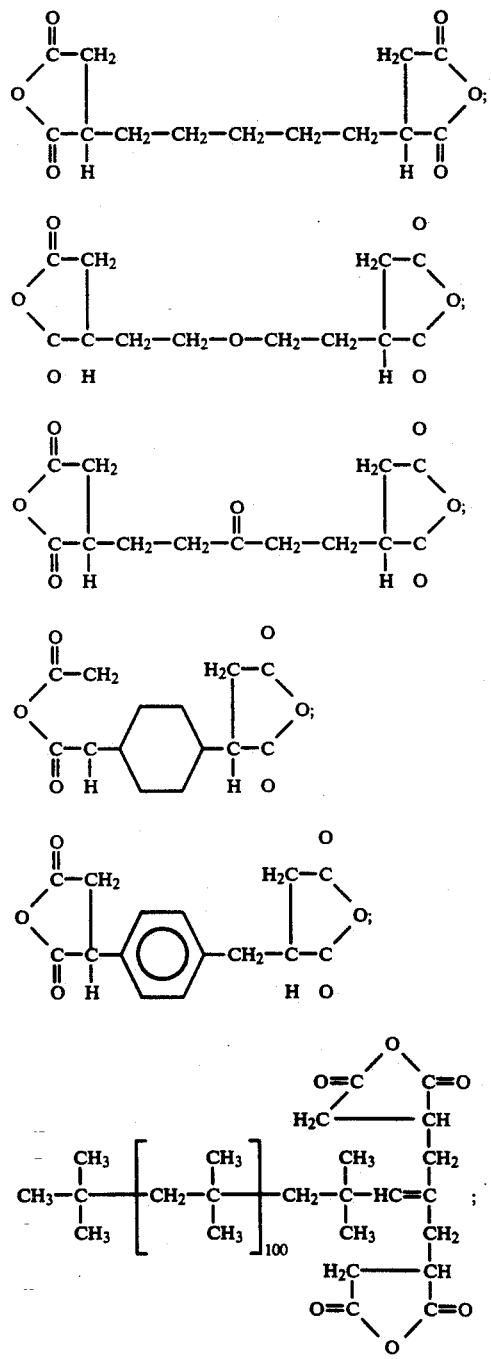

-continued

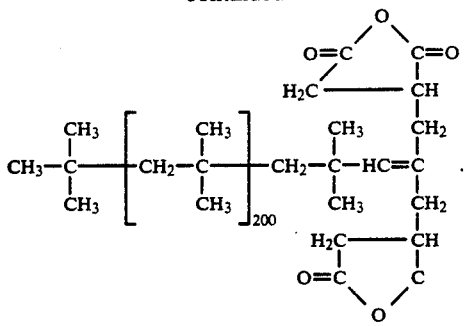

The dianhydrides of Formula VI wherein $R^1$ is a trivalent radical may he represented by the formulae

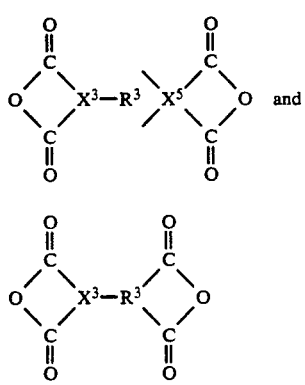

wherein:

$R^3$ is a trivalent hydrocarbon radical or a trivalent substituted hydrocarbon radical;

$X^5$ is a tetravalent aliphatic acyclic hydrocarbon or substituted hydrocarbon radical containing from 2 to about 8 carbon atoms which together with the carbonyl carbon atoms forms acyclic structure; and $X^3$ is as defined hereinafore.

The trivalent hydrocarbon radicals represented by $R^3$ in Formulae Vb and Vb$^1$ are trivalent cycloaliphatic or aromatic hydrocarbon radicals. The trivalent cycloaliphatic hydrocarbon radicals represented by $R^3$ preferably contain from 3 to about 16 ring carbon atoms. The trivalent aromatic hydrocarbon radicals represented by $R^3$ preferably contain from 6 to 12 ring carbon atoms. The trivalent substituted hydrocarbon radicals represented by $R^3$ are those trivalent hydrocarbon radicals described hereinafore which contain at least 1, preferably from 1 to about 4, substituent groups of the type described hereinafore on the ring carbon atoms.

The tetravalent aliphatic acyclic hydrocarbon radicals represented by $X^5$ Formula Vb are those containing from 1 to about 8 carbon atoms that together with the two carbonyl carbon atoms form a cyclic structure. These radicals include the alkanetetrayl radicals. The tetravalent substituted aliphatic acylic hydrocarbon radicals represented by $X^5$ in Formula VIb are those tetravalent aliphatic acyclic hydrocarbon radicals described hereinafore which contain at least one substituent group of the type described hereinafore.

Some illustrative non-limiting examples of the dianhydrides of Formulae VIb and VIb$^1$ include

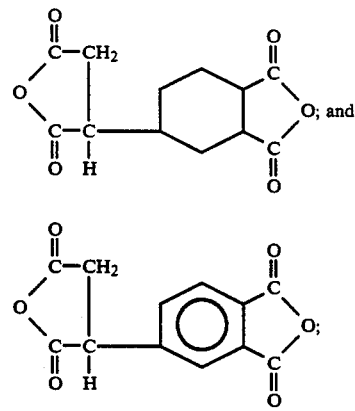

The dianhydrides of Formula VI wherein R' is a tetravalent radical may be represented by the formulae

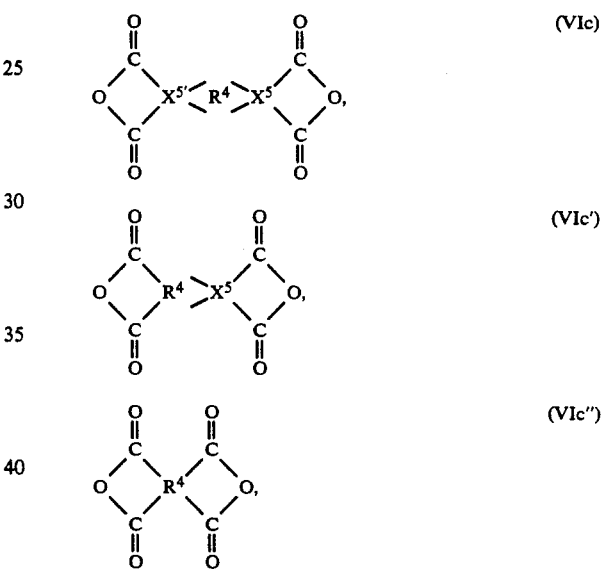

wherein:

$R^4$ is a tetravalent hydrocarbon radical or a tetravalent substituted hydrocarbon radical;

$X^5$ is a trivalent aliphatic acyclic hydrocarbon or substituted hydrocarbon radical containing from 2 to about 8 carbon atoms which together with the carbonyl carbon atoms forms a cyclic structure; and $X^{5'}$ is a tetravalent aliphatic a cyclic hydrocarbon or substituted hydrocarbon radical containing from 2 to about 8 carbon atoms which together with the carbonyl carbon atoms forms a cyclic structure.

The tetravalent hydrocarbon radicals represented by $R^4$ in Formulae VIc—VIc" are tetravalent cycloaliphatic or aromatic hydrocarbon radicals. The tetravalent cycloaliphatic or aromatic hydrocarbon radicals preferably contain from 4 to about 16 ring carbon atoms. The tetravalent aromatic hydrocarbon radicals preferably contain from 6 to 12 ring carbon atoms. The tetravalent substituted hydrocarbon radicals represented by $R^4$ are these tetravalent hydrocarbon radicals described alone which contain at least one substituent group of the type described hereinafore on at least one carbon atom.

Some illustrative non-limiting examples of the dianhydrides of Formulae VIc—VIc" include

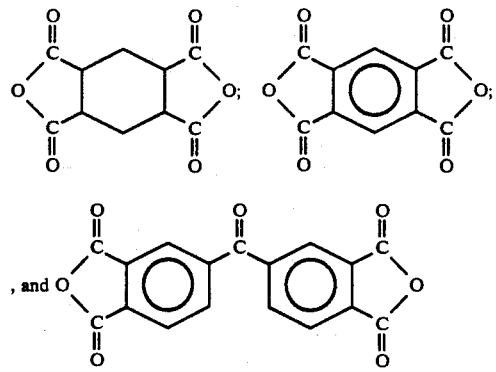

These polyanhydrides are reacted with the polyamines, polyols or amino alcohols described hereinafore to produce the intermediate adducts which are then reacted with the aforedescribed hydrocarbyl substituted dicarboxylic acid producing material or hydrocarbyl substituted hydroxy aromatic material and aldehyde to yield the dispersants of the present invention.

The reaction between a polyamine and a polyanhydride to form the intermediate polyanhydride-polyamine adduct is described, for the case of a dianhydride, in Equation 1 above. In this reaction the different anhydride moieties in the same polyanhydride molecule react with the primary amino groups on different polyamine molecules to join or link together different polyamine molecules via the polyanhydride molecule.

If a polyanhydride containing more than two dicarboxylic anhydride groups per molecule, such as a anhydride, is reacted with a polyamine such as TEPA then three molecules of polyamine will be joined or connected together by the polyanhydride. This is illustrated by the following reaction scheme:

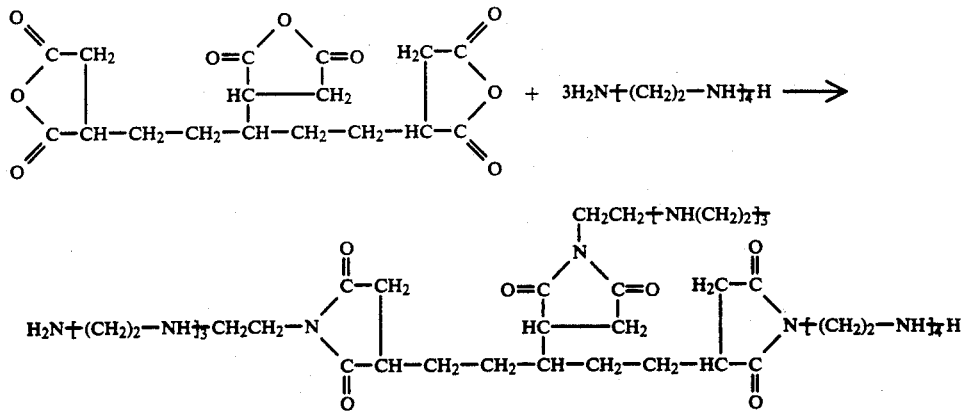

If a polyamine containing more than two, e.g., three, primary amino groups, per molecule is used then one such polyamine molecule may be linked or connected to two other polyamine molecules by three dianhydride molecules. In such case the three primary amino groups on each polyamine molecule react with anhydride groups on different polyanhydride molecules.

The chemistry of the polyanhydride-polyamine reaction is such that the primary amino functionality in the polyamine is more reactive than the secondary amino functionality with the anhydride group of the polyanhydride and therefore the product structure A, i.e., imide, illustrated in Equations 1 and 2 will be the favored product. It is also possible, however, that the secondary amino functionality or the hydroxyl functionality of the resulting adduct can react with further molecules of the polyanhydride to form a diversity of structures, including structures B and C in Equation 1.

In general the polyanhydride-polyamine intermediate adducts of the present invention comprise molecules of polyamines linked to each other by polyanhydride molecules. For purposes of illustration and exemplification only, and assuming that the polyamine is a polyamine of Formula I and the polyanhydride is a dianhydride of Formula V, the polyanhydride-polyamine intermediate adduct contains at least one of the following recurring structural units

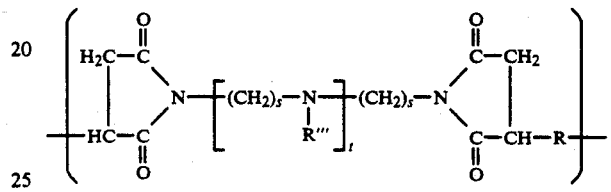

wherein R, R''', s and t are as defined hereinafore.

The stoichiometry of the polyanhydride and polyamine is one of the factors that determines the length of the polyanhydride-polyamine adduct, e.g., number of recurring structural units of Formula X. Generally, increasing the concentration in the reaction mixture of the polyanhydride, up to a point where there is present an equivalent amount of anhydride moieties per primary amino moieties, results in an increase in the length and molecular weight of the intermediate adduct.

Other factors which influence the length and molecular weight of the adduct are reaction times and reaction temperatures. Generally, assuming a fixed amount of polyanhydride in the polyanhydride-polyamine reaction mixture, a higher reaction temperature and/or a longer reaction time results in longer or higher molecular weight intermediate adduct product.

Reaction between the polyanhydride and polyamine is carried out by adding an amount of polyanhydride to the polyamine which is effective to couple or link at least some of the polyamine molecules. It is readily apparent to those skilled in the art that the amount of polyanhydride utilized depends upon a number of factors including (1) the number of reactive, e.g., primary, amino groups present in the polyamine, (2) the number of anhydride groups present in the polyanhydride, (3) and the number of polyamine molecules that it is desired to react, i.e., the degree of coupling or chain length of the polyanhydride-polyamine adduct it is desired to achieve.

Generally, however, it is preferred to utilize an amount of polyanhydride such that there are present from about 0.01 to 5 equivalents of anhydride groups per equivalent of reactive, e.g., primary, amino groups, preferably from about 0.1 to 2 equivalents of anhydride groups per equivalent of primary amino group. It is preferred, however, that the polyamine be present in excess in the polyanhydride-polyamine reaction mixture.

With appropriate variations to provide for the presence of hydroxyl groups the aforedescribed method and discussion for the preparation of the polyanhydride-polyamine intermediate adducts is also applicable to the polyanhydride-polyol and polyanhydride-amino alcohol adducts.

In order to form the dispersants of the present invention the long chain hydrocarbyl substituted dicarboxylic acid material (ii)(a) or the long chain hydrocarbon substituted phenol and an aldehyde (ii)(b) is reacted with a polyanhydride-polyamine adduct, a polyanhydride-polyol adduct, a polyanhydride-amino alcohol adduct, or a mixture thereof. The amounts of polyanhydride adduct and hydrocarbyl substituted dicarboxylic acid material or aldehyde and hydrocarbyl substituted hydroxy aromatic compound utilized in this reaction are amounts which are effective to form the dispersants of the instant invention, i.e., dispersant forming effective amounts. It will be apparent to those skilled in the art that the amount of polyanhydride adduct utilized will depend, in part, upon the number of reactive groups (reactive primary amino groups in the polyanhydride-polyamine adduct, reactive hydroxyl groups in the polyanhydride-polyol adduct, etc.) present in said polyanhydride adduct which are available for reaction with, for example, carboxylic acid or anhydride groups of the hydrocarbyl substituted dicarboxylic acid material. Generally, however, the amount of the polyanhydride adduct is such that sufficient polyanhydride adduct is present to provide from about 0.5 to 15, preferably from about 1 to 10, and more preferably from about 2 to 4 reactive groups or equivalents, e.g., primary amino groups, for each carboxylic acid or anhydride group or equivalent present in the hydrocarbyl substituted dicarboxylic acid material.

The reaction conditions under which the reaction between the polyanhydride adduct reactant and the hydrocarbyl substituted dicarboxylic acid material reactant or aldehyde and hydrocarbyl substituted hydroxy aromatic compound reactants is carried out are those that are effective for coreaction between said reactants to occur. Generally, the reaction will proceed at from about 50° to 250° C., preferably 100° to 210° C. While super-atmospheric pressures are not precluded, the reaction generally proceeds satisfactorily at atmospheric pressure. The reaction may be conducted using a mineral oil, e.g., 100 neutral oil, as a solvent. An inert organic co-solvent, e.g., xylene or toluene, may also be used. The reaction time generally ranges from about 0.25 to 24 hours.

The reaction between the polyanhydride-polyamine adduct and the hydrocarbyl substituted dicarboxylic acid material may be exemplified by the following reaction scheme which represents the reaction of polyisobutenyl succinic anhydride with an alkylene dianhydride/tetraethylene pentamine adduct:

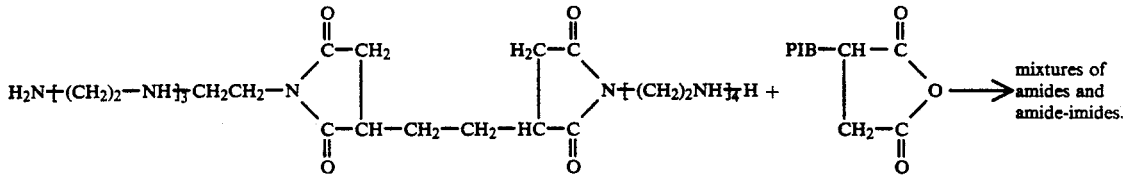

The imide reaction product of this reaction may be represented by structure A above, while the imide-amide product is represented by structure B and C above.

Alternately, all of the above polyanhydride adducts may be reacted with long chain hydrocarbon substituted hydroxy aromatic material and an aldehyde (ii)(b). In this embodiment the long chain hydrocarbon substituted hydroxy aromatic material and an aldehyde may first be prereacted and this reaction product may then be reacted with the polyanhydride intermediate adduct. Alternately the polyanhydride intermediate adduct, long chain hydrocarbon substituted hydroxy aromatic material, and an aldehyde may be reacted substantially simultaneously. In general, the amounts of reactants utilized in these reactions are amounts which are effective to yield the improved dispersants of the instant invention. Generally these amounts are about a molar proportion of long chain hydrocarbon substituted hydroxy aromatic material such as long chain hydrocarbon substituted hydroxy aromatic material such as long chain hydrocarbon substituted phenol, about 1 to about 2.5 moles of aldehyde such as formaldehyde, and about 0.5 to 2 moles of polyanhydride adduct. In general, the reactants are admixed and reacted at an elevated temperature until the reaction is complete. The reaction may be conducted in the presence of a solvent and in the presence of a quantity of mineral oil.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,443.

Post-treatment compositions include those formed by reacting the novel additives of the present invention with one or more post-treating reagents, usually selected from the group consisting of boron oxide, boron oxide hydrate, boron halides, boron acids, sulfur, sulfur chlorides, phosphorous sulfides and oxides, carboxylic acid or anhydride acylating agents, anhydrides and episulfides and acrylonitriles. The reaction of such post-treating agents with the novel additives of this invention is carried out using procedures known in the art. For example, boration may be accomplished in accordance with the teachings of U.S. Pat. No. 3,254,025 by treating the additive compound of the present invention with a boron oxide, halide, ester or acid. Treatment may be carried out by adding about 1-3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

The compositions produced in accordance with the present invention have been found to be particularly useful as fuel and lubricating oil additives.

When the compositions of this invention are used in normally liquid petroleum fuels, such as middle distillates boiling from about 150° to 800° F. including kerosene, diesel fuels, home heating fuel oil, jet fuels, etc., a concentration of the additive in the fuel in the range of typically from 0.001 wt. % to 0.5 wt. %, preferably 0.005 wt. % to 0.2 wt. %, based on the total weight of the composition, will usually be employed. These additives can contribute fuel stability as well as dispersant activity and/or varnish control behavior to the fuel.

The compounds of this invention find their primary utility, however, in lubricating oil compositions, which employ a base oil in which the additives are dissolved or dispersed. Such base oils may be natural or synthetic.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc. selected type of lubricating oil composition can be included as desired.

The additives of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular polymer adduct hereof, if desired.

Accordingly, while any effective amount of these additives can be incorporated into the fully formulated lubricating oil composition, it is contemplated that such effective amount be sufficient to provide said lube oil composition with an amount of the additive of typically from 0.01 to about 10, e.g., 0.1 to 6.0, and preferably from 0.25 to 3.0 wt. %, based on the weight of said composition.

The additives of the present invention can be incorporated into the lubricating oil in any convenient way. Thus, they can be added directly to the oil by dispersing, or dissolving the same in the oil at the desired level of concentration, typically with the aid of a suitable solvent such as toluene, cyclohexane, or tetrahydrofuran. Such blending can occur at room temperature or elevated.

Natural base oils include mineral lubricating oils which may vary widely as to their crude source, e.g., whether paraffinic, naphthenic, mixed, paraffinicnaphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cSt. at 100° C.

Thus, the additives of the present invention can be employed in a lubricating oil composition which comprises lubricating oil, typically in a major amount, and the additive, typically in a minor amount, which is effective to impart enhanced dispersancy relative to the absence of the additive. Additional conventional additives selected to meet the particular requirements of a temperatures. In this form the additive per se is thus being utilized as a 100% active ingredient form which can 1 added to the oil or fuel formulation by the purchase: Alternatively, these additives may be blended with suitable oil-soluble solvent and base oil to form concentrate, which may then be blended with a lubricating oil base stock to obtain the final formulation Concentrates will typically contain from about 2 to 80 wt. %, by weight of the additive, and preferably from about 5 to 40% by weight of the additive.

The lubricating oil base stock for the additive of the present invention typically is adapted to perform selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, anti-wear agents, pour point depressants, detergents, rust inhibitors and the like.

Viscosity modifiers impart high and low temperature operability to the lubricating oil and permit it to remain shear stable at elevated temperatures and also exhibit acceptable viscosity or fluidity at low temperatures. These viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have weight average molecular weights of from about 10,000 to 1,000,000, preferably 20,000 to 500,000, as determined by gel permeation chromatography or light scattering methods.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol and or of an alkylphenol thioester, and also preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for $\frac{1}{2}$ to 15 hours, at temperature in the range of about 66° to about 316° C. Neutralization of the phosphosulfurized hydrocarbon may be effected in the manner taught in U.S Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oilsoluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(R^{20}R^{21},NCSS)zCu$ (where z is 1 or 2, and $R^{20}$ and $R^{21}$, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as $R^{20}$ and $R^{21}$, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., $R^{20}$ and $R^{21}$,) will generally be about 5 or greater. Copper sulphonates, phenates, and acetylacetonates may also be used.

Exemplary of useful copper compounds are copper $Cu^I$ and/or $Cu^{II}$ salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° C. and about 200° C. Temperatures of 100° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U S Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenylsuccinamic acids or succinimides: U.S. Pat. No. 3,932,290 which discloses reaction products of di- (lower alkyl) phosphites and anhydrides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are C8-C18 dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz. overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | .01–5 | .01–1.5 |
| Oxidation Inhibitor | .01–5 | .01–1.5 |
| Dispersant | .1–20 | .1–8 |
| Pour Point Depressant | .01–5 | .01–1.5 |
| Anti-Foaming Agents | .001–3 | .001–0.15 |
| Anti-Wear Agents | .001–5 | .001–1.5 |
| Friction Modifiers | .01–5 | .01–1.5 |
| Detergents/Rust Inhibitors | .01–10 | .01–3 |
| Mineral Oil Base | Balance | Balance |

When other additives are employed it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

This invention will be further understood by reference to the following example, wherein all parts are parts by weight and all molecular weights are number weight average molecular weights as noted, and which include preferred embodiments of the invention.

The following example illustrates a dispersant falling outside the scope of the instant invention in that no polyanhydride is utilized in the preparation of this dispersant. This example is presented for comparative purposes only.

COMPARATIVE EXAMPLE 1

Into a reactor vessel are charged, under a nitrogen blanket, 134 grams of S150N mineral oil, 4.7 grams (0.05 mole) of tetraethylene pentamine and 197.84 grams (0.1 mole) of polyisobutylene succinic anhydride (reaction product of maleic anhydride and polyisobutylene having a $\overline{M}_n$ of about 2,225, said reaction product having a polyisobutylene to succinic anhydride ratio of about 1:1.1). The resultant reaction mixture is heated at 150° C. and sparged with nitrogen for 3 hours. The oil solution containing the product is filtered and the resultant filtered solution of the product has a viscosity at 100° C. of 408 centistokes.

The following example illustrate a dispersant of the instant invention.

EXAMPLE 2

Into a reactor vessel are, charged under a nitrogen blanket, 140 grams of S150N mineral oil, 100 cc of toluene, 20 cc of isopropanol 5.4 grams (0.025 mole) of paramellitic dianhydride, and 4.7 grams (0.05 mole) of tetraethylene pentamine. This reaction mixture is heated at 120° C. for one hour. At the end of this one-hour period 197.8 grams (0.1 mole) of polyisobutylene succinic anhydride of the type used in Comparative Example 1 are introduced into the reactor vessel and the resultant reaction mixture is heated at 150° C. for 3 hours while sparging with nitrogen. the solution containing the product is filtered and the resultant filtered solution of the product has a viscosity at 100° C. of 750 centistokes.

As can be seen the viscosity of the oil solution of the dispersant of the instant invention (Example 2) is higher than that of the oil solution of conventional dispersant of Comparative Example 1.

What is claimed is:

1. An oil soluble composition useful as dispersant additive in lubrication oils consisting essentially of reaction product of:
   (i) a dispersant-imparting effective amount of at least one intermediate adduct consisting essentially of reaction product of
      (a) at least one polyanhydride reactant, and
      (b) at least one polyamine reactant wherein the polyamine reactant contains at least two reactive amino groups, at least one of which is a primary amino group, wherein the amount of polyanhydride reactant utilized is such that there are present about 0.01 to about 10 equivalents of anhydride groups per equivalent of primary amino group, and wherein said intermediate adduct comprises within its structure a moiety comprising the residue of at least two polyanhydride molecules linked together by the reside of a polyamine molecule, reacted with;
   (ii) at least one long chain hydrocarbyl substituted $C_4$–$C_{10}$ dicarboxylic acid or anhydride, wherein said long chain hydrocarbyl has a number average molecular weight of from about 500 to about 6,000, and wherein the amount of adduct present is sufficient to provide from about 0.5 to about 15 reactive amino groups for each carboxylic acid or anhydride group present on the hydrocarbyl substituted dicarboxylic acid or anhydride.

2. The composition of claim 1 wherein said long chain hydrocarbyl substituted $C_4$–$C_{10}$ dicarboxylic acid or anhydride (ii) is comprised of reaction product of olefin polymer of a $C_2$–$C_{18}$ monoolefin, said olefin polymer having a number average molecular weight of about 500 to about 6,000, and a $C_4$–$C_{10}$ monounsaturated dicarboxylic acid or anhydride.

3. The composition of claim 2 wherein said olefin polymer is polyisobutylene.

4. The composition of claim 3 wherein said monounsaturated dicarboxylic acid or anhydride is maleic anhydride.

5. The composition of claim 4 wherein the number average molecular weight of said polyisobutylene is from about 850 to about 1,000.

6. The composition of claim 1 wherein said polyamine reactant contains at least one primary amino group and at least one secondary amino group.

7. The composition of claim 1 wherein said polyamine reactant is an aliphatic saturated amine represented by the formula

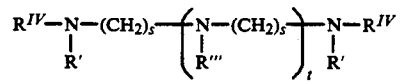

wherein:
$R^{IV}$, $R'$ and $R'''$ are independently selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_2$ to $C_{12}$ alkylamino $C_2$ to $C_6$ alkylene radicals;
each s is independently selected from integers having a value of from 2 to 6; and
t is a number of 0 to 10, with the proviso that $R^{IV}$, $R'$ and $R'''$ are selected such that said polyamine reactant always contains at least two reactive amino groups, at least one of which is a primary amino group.

8. The composition of claim 1 wherein said polyamine is selected from the group consisting of 1,2-diaminoethane, 1,3-diaminopropane, 1,4-diaminobutane, diethylene triamine, N,N-di-(2-aminoethyl)ethylene diamine, and N-dodecyl-1,3-propane diamine.

9. The composition of claim 1 wherein said polyamine is a polyoxyalklene polyamine.

10. A concentrate comprising about 10% to about 97.5% of a lubricating oil and about 2.5% to about 90% of the dispersant additive of claim 1.

11. The composition of claim 1 wherein said polyanhydride reactant is represented by the formula

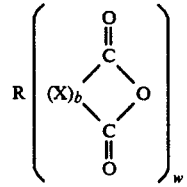

wherein:
b is 0 or 1;
w is the number of

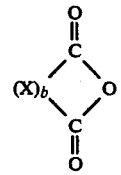

groups present on R, and is at least 2;
X is a q valent aliphatic acyclic hydrocarbon or substituted hydrocarbon radical containing from 2 to about 8 carbon atoms which together with the two carbonyl carbon atoms forms a cyclic structure, where q is 3 or 4; and
R is a z valent hydrocarbon radical, substituted hydrocarbon radical, hydrocarbon radical containing at least one hetero atom or group, or substituted hydrocarbon radical containing at least one hetero atom or group, wherein z=(q-2)w with the proviso that if b=0 then q=4.

12. The composition of claim 11 wherein w is from 2 to about 10.

13. The composition of claim 12 wherein b is one.

14. The composition of claim 12 wherein w is two.

15. A lubricating oil composition comprising:
(A) a major amount of lubricating oil; and
(B) a minor amount of an oil soluble dispersant consisting essentially of reaction product of
(i) at least one intermediate adduct consisting essentially of reaction product of
(a) a dispersant-imparting effective amount of at least one polyanhydride reactant, and
(b) at least one polyamine reactant, wherein the polyamine reactant contains at least two reactive amino groups at least one of which is a primary amino group, wherein the amount of polyanhydride reactant utilized is such that there are present about 0.01 to about 10 equivalents of anhydride groups per equivalent of primary amino group, and wherein said intermediate adduct comprises within its structure a moiety comprising at least two polyanhydride molecules linked together by the residue of a polyamine molecule, reacted with
(ii) at least one long chain hydrocarbyl substituted $C_4$-$C_{10}$ dicarboxylic acid or anhydride, wherein said long chain hydrocarbyl has a number average molecular weight of from about 500 to about 6,000, and wherein the amount of adduct present is sufficient to provide about 0.5 to about 15 reactive amino groups for each hydrocarbyl substituted carboxylic acid or anhydride.

16. The composition of claim 15 wherein said polyamine contains at least one secondary amino group.

17. The composition of claim 15 wherein said polyamine is a polyoxyalkylene polyamine.

18. The composition of claim 15 wherein said long chain hydrocarbyl substituted $C_4$-$C_{10}$ dicarboxylic acid or anhydride (B)(ii) is comprised of reaction product of olefin polymer of a $C_2$-$C_{18}$ monoolefin, said olefin polymer having a number average molecular weight of about 500 to about 6,000, and a $C_4$-$C_{10}$ monounsaturated dicarboxylic acid, wherein there are an average of about 0.7 to about 2.0 dicarboxylic acid producing moieties per molecule of said olefin polymer or anhydride.

19. The composition of claim 18 wherein said olefin polymer is polyisobutylene.

20. The composition of claim 19 wherein said monounsaturated dicarboxylic acid or anhydride is maleic anhydride.

21. The composition of claim 20 wherein the number average molecular weight of said polyisobutylene is from about 800 to about 2,500.

22. The composition of claim 15 wherein said polyamine reactant is an aliphatic saturated amine represented by the formula $$R^{IV}-N-(CH_2)_s-\left(N-(CH_2)_s\right)_t-N-R^{IV}$$
$$\quad\;\;|\qquad\qquad\;\;|\qquad\qquad\;|$$
$$\quad\;\;R'\qquad\qquad R'''\qquad\qquad R'$$

wherein:
$R^{IV}$, $R'$ and $R'''$ are independently selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_2$ to $C_{12}$ alkylamino $C_2$ to $C_6$ alkylene radicals;
each s is independently selected from integers having a value of from 2 to 6; and
t is a number of 0 to 10, with the proviso that $R^{IV}$, $R'$ and $R'''$ are selected such that said polyamine reactant always contains at least two reactive amino groups, at least one of which is a primary amino group.

23. The composition of claim 22 wherein said polyamine reactant is selected from the group consisting of 1,2-diaminoethane, 1,3-diaminopropane, 1,4-diaminobutane, diethylene triamine, triethylene tetramine, tetraethylene pentamine, di-(1,3-propylene)triamine, N,N-di-(2-aminoethyl)ethylene diamine, and N-dodecyl-1,3propane diamine.

24. The composition of claim 15 wherein said polyanhydride reactant is represented by the formula $$\left\{R\left[(X)_b \begin{matrix} & \overset{O}{\underset{\parallel}{C}} & \\ \diagup & & \diagdown \\ & & O \\ \diagdown & & \diagup \\ & \underset{\parallel}{C} & \\ & O & \end{matrix}\right]\right\}_w$$

wherein:
b is 0 or 1;
w is the number of $$\begin{matrix} & \overset{O}{\underset{\parallel}{C}} & \\ \diagup & & \diagdown \\ (X)_b & & O \\ \diagdown & & \diagup \\ & \underset{\parallel}{C} & \\ & O & \end{matrix}$$

groups present on R, and is at least 2;
X is a q valent aliphatic acyclic hydrocarbon or substituted hydrocarbon radical containing from 2 to about 8 carbon atoms which together with the two carbonyl carbon atoms forms a cyclic structure, where q is 3 or 4; and
R is a z valent hydrocarbon radical, substituted hydrocarbon radical, hydrocarbon radical containing at least one hetero atom or group, or substituted hydrocarbon radical containing at least one hetero atom or group, where z=(q-2)w with the proviso that if b=0 then q=4.

25. The composition of claim 24 wherein w is from 2 to about 10.

26. The composition of claim 25 wherein b is one.

27. The composition of claim 26 wherein w is two.

28. A process for preparing a polyanhydride adduct material useful as a lubricating oil additive comprising:
(i) reacting a dispersant-imparting effective amount of at least one polyanhydride reactant with at least one polyamine to reactant form a polyanhydride intermediate adduct having within its structure the residue of at least two polyanhydride molecules linked together by the residue of a polyamine molecule, wherein the polyamine reactant contains at least two reactive amino groups at least one of which is a primary amino group and wherein the amount of polyanhydride reactant utilized is such that there are present about 0.01 to about 10 equivalents of anhydride groups per equivalent of primary amino group; and (ii) reacting said polyanhydride intermediate adduct with at least one hydrocarbyl substituted acid or anhydride being formed by reacting an olefin polymer of a $C_2$-$C_{18}$ monoolefin, said olefin polymer having a number average molecular weight of about 500 to about 6,000, and a $C_4$-$C_{10}$ monounsaturated dicarboxylic acid or anhydride, wherein the amount of adduct present is sufficient to provide about 0.5 to about 15 reactive amino groups for each hydrocarbyl substituted carboxylic acid or anhydride.

29. The process of claim 28 wherein the polyamine reactant is used such that the total number of reactive amino groups in the reaction mixture is in stoichiometric excess relative to the total number of anhydride moieties in the polyanhydride reactant present in the reaction mixture.

30. The process of claim 28 wherein said $C_4$-$C_{10}$ monounsaturated dicarboxylic acid or anhydride is maleic anhydride.

31. The process of claim 30 wherein said olefin polymer comprises polyisobutylene, wherein there are about 1 to about 1.5 succinic anhydride units per polyisobutylene moiety present in said hydrocarbyl substituted $C_4$-$C_{10}$ dicarboxylic acid or anhydride, and wherein the number average molecular weight of said polyisobutylene is from about 800 to about 2500.

32. The process of claim 30 wherein said polyamine reactant is an aliphatic saturated amine having the formula:

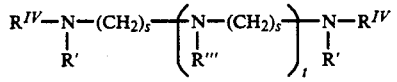

wherein $R^{IV}$, $R'$ and $R'''$ are independently selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_2$ to $C_{12}$ alkylamino $C_2$ to $C_6$ alkylene radicals; each s is independently selected from integers having a value of from 2 to 6; and t is a number of 0 to 10, with the proviso that $R^{IV}$, $R'$ and $R'''$ are selected such that said polyamine reactant always contains at least two reactive amino groups, at least one of which is a primary amino group.

33. The process of claim 32, wherein said amine polyamine reactant is selected from the group consisting of 1,2-diaminoethane, 1,3-diaminopropane, 1,4-diaminobutane, 6-diaminopropane, diethylene triamine, triethylene tetramine, tetraethylene pentamine, di-(1,3-propylene) triamine, N,N-di-(2-aminoethyl) ethylene diamine, and N dodecyl-1,3-propane diamine.

34. The process of claim 28 wherein said polyamine reactant has from 2 to about 60 total carbon atoms and from about 2 to about 12 nitrogen atoms.

35. The process of claim 34 wherein said polyamine reactant is a polyoxyalkylene polyamine.

36. The process of claim 28 wherein the polyanhydride reactant is used in an amount sufficient to provide from about 0.1 to about 5 equivalents of anhydride moieties per one reactive amino moiety, said reactive amino moiety being selected from the group consisting of primary and secondary amino moieties.

37. The process of claim 36 wherein the polyanhydride reactant is used in an amount sufficient to provide from about 0.1 to about 2 equivalents of anhydride moieties per one reactive amino moiety.

38. The process of claim 25 wherein said polyanhydride reactant is represented by the formula

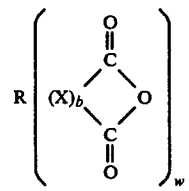

wherein:
b is 0 or 1;
w is the number of

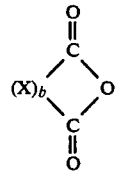

groups present on R, and is at least 2;

X is a q valent aliphatic acyclic hydrocarbon or substituted hydrocarbon radical containing from 2 to about 8 carbon atoms which together with the two carbonyl carbon atoms forms a cyclic structure, where q is 3 or 4; and R is a z valent hydrocarbon radical, substituted hydrocarbon radical, hydrocarbon radical containing at least one hetero atom or group, or substituted hydrocarbon radical containing at least one hetero atom or group, where z=(q-2)w with the proviso that if b=0 then q=4.

39. The process of claim 38 wherein w is from 2 to about 10.

40. The process of claim 39 wherein b is one.

41. The process of claim 40 wherein w is two.

* * * * *